Jan. 8, 1974   J. R. STUDER   3,784,658
METHOD FOR THE SELECTIVE ABSORPTION OF A VOLATILE LIQUID
FOAMING AGENT BY HEATING IN FORMING PLASTIC ARTICLES
Filed June 9, 1971   2 Sheets-Sheet 1

INVENTOR
JAMES R. STUDER
BY
Michael J. Murphy
ATTORNEY

Jan. 8, 1974   J. R. STUDER   3,784,658
METHOD FOR THE SELECTIVE ABSORPTION OF A VOLATILE LIQUID
FOAMING AGENT BY HEATING IN FORMING PLASTIC ARTICLES
Filed June 9, 1971   2 Sheets-Sheet 2

INVENTOR
JAMES R. STUDER
BY
*Michael J. Murphy*
ATTORNEY

United States Patent Office 3,784,658
Patented Jan. 8, 1974

3,784,658
METHOD FOR THE SELECTIVE ABSORPTION OF A VOLATILE LIQUID FOAMING AGENT BY HEATING IN FORMING PLASTIC ARTICLES
James R. Studer, Woodridge, Ill., assignor to Monsanto Company, St. Louis, Mo.
Filed June 9, 1971, Ser. No. 151,457
Int. Cl. B29d 7/22, 27/00
U.S. Cl. 264—45
4 Claims

ABSTRACT OF THE DISCLOSURE

Improvements in forming an integral foam layer on the outer surface of the sidewall of a thin walled thermoplastic container which involves contacting the inner surface of the container opposite the outer surface portion to be foamed, prior to exposure to the foaming agent, with an elevated temperature surface to preheat the wall portion of the cup which is to be foamed, thereby increasing the rate of penetration of the foaming agent into the thermoplastic during its subsequent exposure and preferably avoiding the necessity of a period of aging the container after its removal from exposure to the foaming agent and prior to foaming. The elevated temperature surface is preferably that of a mandrel conforming in shape to the inner surface of the container and which may have relieved areas thereon which do not contact and therefore, do not heat the wall of the container, thereby leaving unfoamed, indicia bearing or patterned portions within the foam boundary after vaporization of the foaming agent. An additive may be incorporated into the foaming agent to decrease the rate of generation of the foam cells during foaming and to improve the uniformity of cell size or, when the relieved surface mandrel is used, a dye which vaporizes at substantially the temperature of the foaming agent may be employed to generate a foam layer of one color having an indicia bearing or patterned area of another color. The thermoplastic of the container preferably has a coloring pigment incorporated therein which has been found to act as an effective nucleating agent.

BACKGROUND OF THE INVENTION

This invention relates to forming foam on the surface of an article and more particularly to improvements in generating a foam covering on the outer surface of a thin walled plastic container.

Cup-like thermoplastic containers, such as vending cups, tubs, etc. which are stackable one within the other without sticking together, are being used at present in automated vending machines. Such containers may have a foam temperature-insulating layer thereon comprised of minute hollow cells generated from and as an integral part of the wall of the thermoplastic container. Such an article is described in U.S. Pat. No. 3,471,075. The location of the foam layer along the tapered sidewall of the cup and its thickness are somewhat critical. For a given angle of sidewall taper, if the layer projects out too far from the remainder of the sidewall or is located too close to either the upper or lower end thereof, it will contact the interior surface of the next adjacent, similarly shaped cup into which it is nested. Since such foam has a high coefficient of friction in comparison with that of the unfoamed plastic constituting the remainder of the sidewall, a cup having a foam portion in contact with an adjacent container will not release as readily from the stack as when only unfoamed portions of adjacent containers are in contact with each other.

The manner in which such a foam covering may be generated out of the thermoplastic is disclosed in a series of patents, the most pertinent of which are U.S. Nos. 3,262,625; 3,389,199 and 3,531,554. In the teachings of each of these patents, the shaped article while at room temperature is immersed in the foaming agent, then removed and allowed to age for a period of time, basically for the purpose of allowing the foaming agent to penetrate well into the wall of the thermoplastic, whereupon the article is heated to evaporate the agent and generate the foam cells at the heated area(s) previously exposed to the foaming agent. When it is desired to confine the foam to a specific location, as in the case of the sidewall of the previously mentioned vending cup, the portion of the cup which is not to be foamed must, according to these prior art patents, either be kept out of the foaming agent as indicated in the '625 patent, or chemically or mechanically masked before exposure to the foaming agent as disclosed in the '199 patent, or, alternatively, exposed but then cooled to prevent foaming while other section(s) to be foamed are being heated, as disclosed in the '554 patent. In any event, in the past, special precautions had to be taken with the portion of the container to remain unfoamed, either by carefully shielding it from the foaming agent or by treating the unfoamed portion either before or after exposure to the foaming agent. Needless to say, such special precautions, especially when considered in conjunction with the aging period employed after foaming agent exposure, represented a substantial portion of the 15–20 second overall cycle time covering the period from before immersion thru foam generation, and such extended periods mitigated against low cost, economical, high speed production operations.

SUMMARY OF THE INVENTION

Accordingly, it is a principal object of this invention to provide improvements in the process of forming a foam covering on a thermoplastic container.

An additional object of this invention is to provide cycle time reducing and equipment simplification improvements in the process of foaming an outer surface portion of the sidewall of a thermoplastic container.

Another object of this invention is to increase the rate of penetration of the foaming agent into the sidewall of a cup in a partial foaming process, thereby reducing the time required to provide the cup with the foam covering.

A further object of this invention is to provide a simplified technique for forming a foam band in a predetermined location along the sidewall of a nestable without sticking thermoplastic cup-like container.

Another object of this invention is to entirely eliminate masking in a partial foaming process.

A further object of this invention is to minimize the complexity of the foam generating step in a partial foaming process by treating only the portion of the article to be foamed without contacting the remainder of the cup with anything, even though the remainder had been previously exposed to the foaming agent.

An additional object of this invention is to provide a nestable without sticking cup-like container having a foam covering on the outer surface of a portion of the sidewall which has unfoamed, indicia forming or patterned portions within the boundary thereof.

A further object of this invention is to control the rate of foam generation in a partial foaming process.

Other objects of this invention will in part be obvious and will in part appear hereinafter.

These and other objects are accomplished in the method of producing a foam surface on a thermoplastic article by exposing said article to a foaming agent, allowing said article to age for a short period of time after removal from the foaming agent to permit the foaming agent to penetrate into the thermoplastic and then heating the article to produce a foam covering at the area heated which was in contact with the foaming agent, by providing the improvement which comprises heating the article to a temperature greater than that of the foaming agent but less than that at which the thermoplastic loses its form, prior to exposure to the foaming agent in order to increase the rate of penetration of the foaming agent into the thermoplastic during exposure. Preferably the heating is carried out by bringing the surface of the article opposite that to be exposed to the foaming agent into contact with a surface at a temperature above that at which the foaming agent converts to the gaseous state and then maintaining such contact during exposure. The article in the form of a cup-like container is preferably brought into such contact by mounting the container on a mandrel having an outer surface temperature in excess of that at which the foaming agent converts to the gaseous state such that the outer surface thereof is in heat transfer contact with an inner surface portion of the sidewall of the container prior to exposure of the container to the foaming agent. The mandrel may be relieved along portions of its sidewall to form an indicia bearing or patterned area thereon. When using such a relieved surface mandrel, the foam layer on the sidewall of the container will be formed with indicia and/or a patterned surface within its boundaries corresponding to the design and shape of the relieved area of the mandrel surface. A dye may be added to the foaming agent which preferably vaporizes at substantially the same temperature as the foaming agent, with the result that the foam has the color of the dye whereas the color of the unfoamed portion is the same as that of the basic plastic from which the container was formed.

BRIEF DESCRIPTION OF THE DRAWINGS

In describing the overall invention, reference will be made to the accompanying drawings wherein.

DETAILED DESCRIPTION OF THE ILLUSTRATED EMBODIMENT

Figure 1:
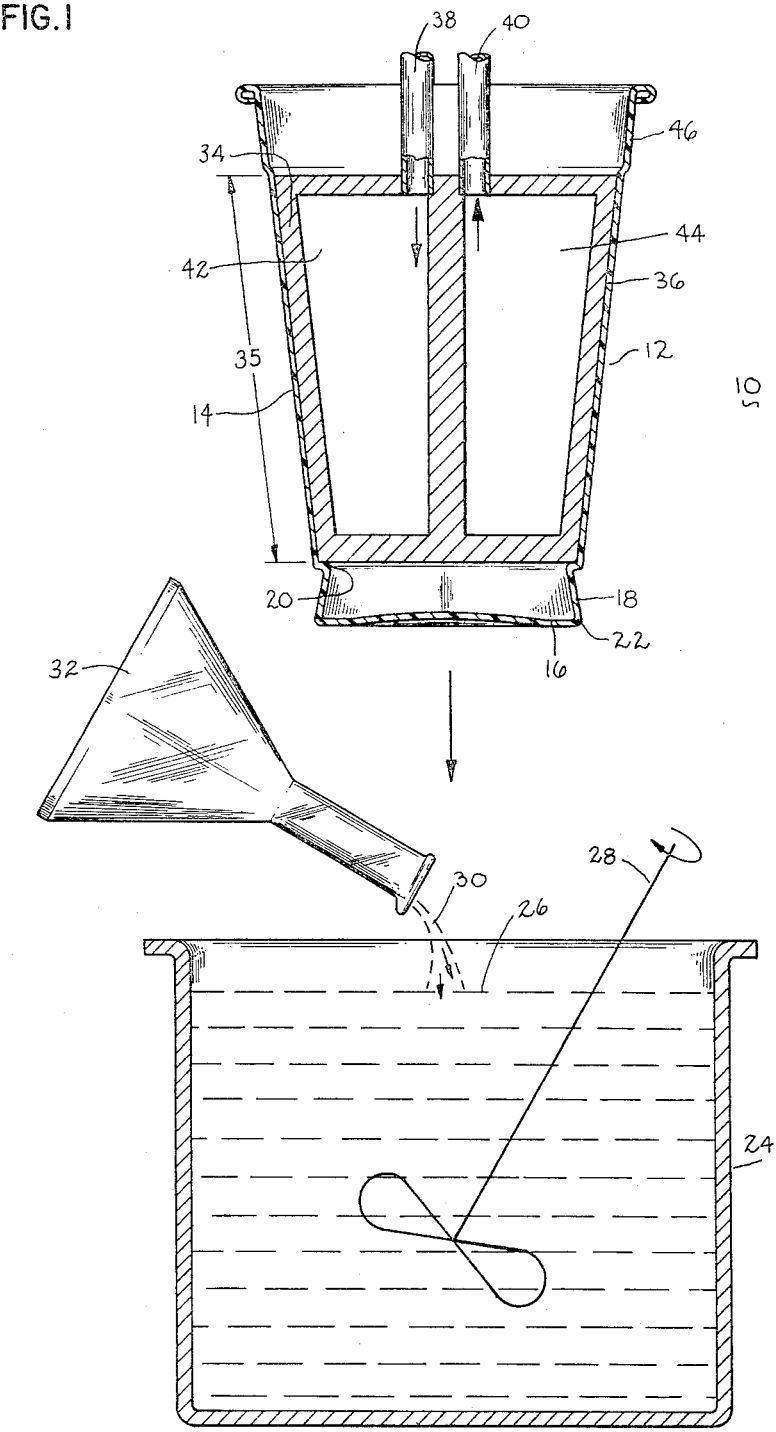
FIG. 1 is a vertical sectional view of the apparatus of the invention at the start of the process.

Referring now to the drawings, there is illustrated in FIG. 1, apparatus 10 for forming a foam layer on an outer wall surface portion of previously formed frustro conical container 12. Container 12 is of one piece thin walled (5–20 mils) construction, designed to be disposable after a single use, and has a sidewall 14 extending upwardly and outwardly, at an angle of about seven degrees with the vertical, from a base 16 to an open upper end. Sidewall 14 has stacking means formed therein which in the illustrated embodiment is a reversely tapered circumferentially extending stacking ring 18 preferably adjacent base 16 which forms supporting shoulder 20 at its upper end against which rests the lower corner 22 of a similarly constructed container when one of such containers is nested within the other. By means of this reversely tapered stacking ring 18, and by controlling the angle of outward taper of sidewall 14, adjacent containers 12 are kept spaced from each other within a stack (except at corner 22 and shoulder 20) and accordingly fall easily away from each container by gravity without sticking together.

Receptacle 24 is provided for holding a foaming agent 26, such as trichlorofluoromethane, commonly known as Freon 11, and which is used to generate the foam cells in the manner to be hereafter described. An agitator 28 may be mounted within receptacle 24 in a conventional manner in order to disperse an optionally useable additive 30 in the foaming agent, additive 30 having been poured into receptacle 24 from a smaller container such as a beaker 32.

Apparatus 10 also includes mandrel 34 which has a frustoconical shape generally conforming in peripheral dimension to and incrementally less than the inside diameter of container 12. Means associated with mandrel 34 are provided for controlling the temperature of the outer surface 36 thereof. Such means may take the form of inlet and outlet conduits 38 and 40 respectively connected to hollow internal chamber sections 42 and 44 of mandrel 34, such conduits communicating with a conventional reservoir of heating medium supply, not shown.

Figure 2:
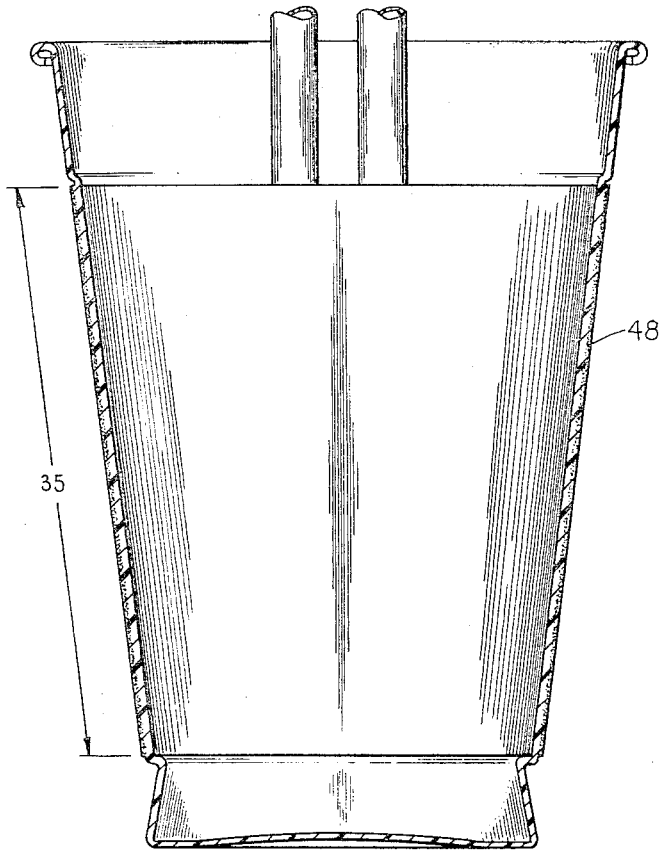
FIG. 2 is a partially sectioned, schematic view illustrating the foam generating step of the process.

In operation, the elongated portion of sidewall 14 of container 12 which is to be foamed, the limits of which must be very closely controlled to avoid rubbing contact with the next adjacent container in a stack, is frictionally engaged with mandrel 34 along its inner wall at the section which is exactly opposite the outer surface portion which is to eventually have the foam covering thereon. This automatically occurs since the length of the mandrel is set as being equivalent to that of foam covering portion 35 (FIG. 2) and since the cup is forced over the mandrel or vice versa until the leading end abuts against shoulder 20 of stacking ring 18. The temperature of surface 36 of mandrel 34, through the full extent of its outer surface at this point in the process, must be above that of the cup, the later preferably being at ambient temperature i.e. between about 30 to 100° F. This outer surface temperature of mandrel 36 is preferably controlled within a certain range, the lower limit of which is greater than the vaporization temperature of foaming agent 26 at atmospheric pressure, and the upper limit of which is less than the temperature at which the thermoplastic of the cup is unable to retain its frusto-conical shape. In the illustrated embodiment, mandrel surface 36 is at 150° F., the trichlorofluoromethane bath is between 55–60° F. and has a vaporization temperature at atmospheric pressure of about 74° F., and the thermoplastic of the container is rubber modified polystyrene which becomes so pliable as to retain a formed shape when held at a temperature of about 240° F. for any length of time in excess of a few seconds. Such surface contact between mandrel 34 and the inner surface of sidewall 14 serves to increase the temperature of the wall portion of the container directly opposite the mandrel to within the aforementioned range, which, for the embodiment being described is between 55 to 150° F. Mounting of cup 12 on mandrel 34 is preferably achieved by applying it over the mandrel prior to immersion within foaming agent 26. Reduced pressure may be imposed by conventional means (for example a porous surface) not shown, between the outer surface of the mandrel and the inner surface of the cup after such mounting to insure that cup 12 does not move on the mandrel during the subsequent steps of the process, and to increase the heat conductive relationship between the two surfaces. As will be observed from FIG. 1, the remainder of the inner surface of container 12 which is opposite the outer surface portions which are to be kept unfoamed to facilitate stacking are not in contact with anything but the surrounding atmosphere, i.e. no chemical or mechanical masking agent whatsoever has been applied.

After cup 12 has been thus mounted, a substantial portion of its outer surface is exposed via immersion into liquid foaming agent 26. The extent of immersion is unimportant except that it must include section 35 which is that portion to be foamed, and which in actual practice does include the lower sidewall area containing stacking ring 18, base 16 and even a section 46 adjacent the upper end of the sidewall. Such exposure by immersion within foaming agent 26 need be for a period of only about 5 seconds when the cup sidewall is at an elevated temperature of 150° F., since penetration of foaming agent 26 into wall 14 is rapid because of the elevated temperature of the thermoplastic. During this immersion step, passage of the heating fluid through mandrel 34 is continued in order to keep surface 36 at the desired elevated temperature. The trichlorofluoromethane foaming agent bath 26, however, is preferably at room temperature in order to minimize evaporation losses. Consequently, some decrease in the surface temperature of the thermoplastic is to be expected when the mandrel mounted container is immersed in the lower temperature foaming agent, but this drop can be determined routinely and the decrease in the rate of penetration into the thermoplastic compensated for by adjusting the temperature of mandrel surface 36. It is within the scope of the present invention to carry out the heating of the thermoplastic in two steps, i.e. initially to a temperature greater than that of the foaming agent prior to immersion and then to a temperature greater than that of the foaming agent vaporization temperature after immersion.

After the 4–5 second period of foaming agent exposure, the mandrel mounted cup is removed from bath 26 while still frictionally retained on the elevated surface temperature mandrel, whereupon the foaming agent in that portion of the sidewall opposite heating surface 36 of mandrel 34 immediately vaporizes since it has substantially reached the elevated temperature of the thermoplastic into which it has penetrated. Such vaporization serves to generate foam layer 48 (FIG. 2) comprising a series of discrete and minute foam cells throughout the full extent of portion 35 of sidewall 14. Thus, as a result of heating the thermoplastic prior to immersion in the foaming agent, the aging period previously employed after immersion and prior to foaming is eliminated and the cycle time, covering the period from just prior to immersion through foam generation is reduced from some 15 to 30 seconds.

Figure 3:
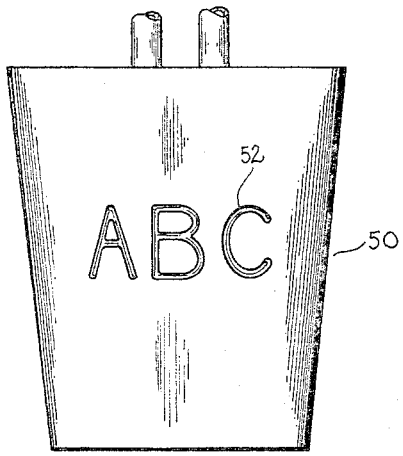
FIG. 3 is an elevational view of an alternative form of mandrel for use in the present invention.
Figure 4:
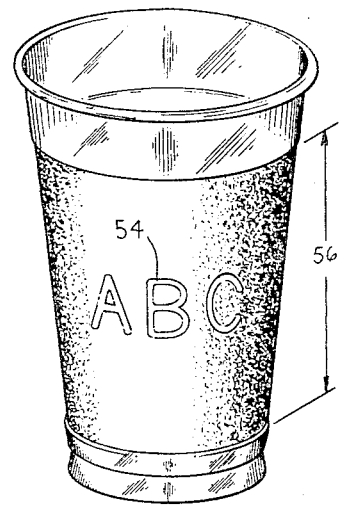
FIG. 4 is a perspective view of a cup having a foam covering generated by means of the mandrel of FIG. 3.

With the apparatus embodiment illustrated in FIG. 3, mandrel 50 is otherwise similar to mandrel 34 of FIG. 1, except that it has particular portions 52 recessed or relieved inwardly from the remainder of the sidewall surface so as to form an indicia bearing or ornamented or patterned area thereon. As can be appreciated, when mandrel 50, having an exterior surface temperature greater than the vaporization temperature of the foaming agent, is in place against the inner wall of a cup after removal from bath 26, the relieved area 52, which in the illustrated embodiment forms the letters ABC, will be spaced back from the inner sidewall surface and consequently will not be incontact therewith. This will result in a reproduction of mandrel area 52 on the cup sidewall during the foam generating step, or in other words, unfoamed portions 54 will be left on the cup sidewall within the boundaries of foam covering 56 (FIG. 4).

As an alternative embodiment of the invention, additive 30 (FIG. 1) may be in the form of a coloring dye, which preferably vaporizes at approximately the same temperature as that of the foaming agent. When such a dye is employed and mandrel 50 of FIG. 3 is used to generate the heat for creating the foams cells, foam covering 56 will have the same color as that of the dye whereas indicia forming portions 54 which are unfoamed and are part of the plastic forming the underlying sidewall of the container, will have the same color as that of the remainder of the cup prior to forming.

Also, it has been found that when the container is formed from a styrene based thermoplastic having between about ½ to 5 weight percent, based on the weight of the thermoplastic, of a finely divided coloring pigment incorporated therein, that the pigment acts as a nucleating agent for the foam cells, or in other words the pigment particles become associated with the molecules of the foaming agent and serve as cell generating sites to the extent that a somewhat smoother foam of more uniform cell size is generated than if such a pigment is not incorporated into the thermoplastic. Also, it has been found that when an additive 30, such as silicone oil, is added to the foaming agent when the latter is comprised of trichlorofluoromethane, that the silicone oil advantageously extended the foam generating steps but not to such an extent as to appreciably affect the overall cycle time. In other words, without the presence of silicone oil dissolved in the foaming agent, the thermoplastic would foam in approximately one second, but the foam was somewhat coarse which may be adequate for some applications but which is borderline at best when the function of the foam is for high temperature insulating purposes on the outside of the sidewall of a vending cup. When the silicone oil was added to foaming agent bath 26, it was found that the cellular structure of the foam was smaller and more uniform having been generated in a period of about 1.25 seconds. Other such additives soluble in the foaming agent and which may be advantageously used in the same way are mineral oils.

The above description and particularly the drawings are set forth for purposes of illustration only and are not to be taken in a limited sense.

With the improved process of the present invention, even though significant portions of the outer surface of the container are exposed to the foaming agent, the portion which is eventually foamed is very accurately controlled and this is highly desirable in high speed production operations, as opposed to carefully confining exposure to only those portions to be foamed, or else separately masking those portions not to be foamed to shield them from exposure to the foaming agent. Such exposed areas will not foam, according to the present invention, even though exposed to the foaming agent, and thus the need for masking is entirely eliminated.

Various modifications and alterations of the invention disclosed herein will be readily suggested to persons skilled in the art. It is intended, therefore that the foregoing be considered as exemplary only and that the scope of the invention be ascertained from the following claims.

What is claimed is:

1. In the method of foaming an area of the outer surface of a cuplike container formed of a thermoplastic resin by exposing an outer surface portion of the container which includes said surface area to be foamed to a volatile, liquid organic foaming agent and selectively heating the portion of the inner surface of the container opposite said area of the exposed outer surface portion to be foamed to generate said foam, the improvement which comprises carrying out said heating both before and during exposure to the foaming agent while keeping the remainder of the inner surface of the container opposite the exposed portion out of contact with any other applied heat transfer surface.

2. The process of claim 1 which includes the step of mounting said container on a mandrel having an outer surface temperature in excess of that at which the foaming agent converts to the gaseous state such that said outer surface is in heat transfer contact with an inner surface portion of the sidewall of said container prior to exposure of said container to the foaming agent.

3. The process of claim 2 wherein indicia-defining portions of said high temperature surface of the mandrel are kept out of contact with the inner surface of said container during said heating thereby remaining unfoamed and defining indicia on the outer surface of the container within the boundary of the foamed surface generally corresponding to the indicia-defining portions of the high temperature surface.

4. A method of forming a foam layer on an outer surface portion of a frusto-conical container formed of a styrene-based thermoplastic which comprises:
   (a) frictionally engaging an area of an inner wall portion of said container which is opposite the outer surface portion to be foamed with a frusto-conical mandrel having a temperature throughout the full extent of its outer surface which is within a range, the lower limit of which is greater than the vaporization temperature of trichlorofluoromethane foaming agent for generating said foam and the upper limit of which is less than the temperature at which said thermoplastic is unable to retain its frusto-conical shape, in order to increase the temperature of the wall portion of the container opposite the mandrel to within said range, the temperature of said container prior to engagement with said mandrel being between 30 to 100° F., and the remainder of the inner wall of said container being unengaged by anything during heating of said engaged wall portion;

(b) exposing a substantial portion of the outer surface of said mandrel-engaged container which includes that to be foamed and which was heated by the mandrel, to said foaming agent for a short period of time; and (c) removing said container from exposure to said foaming agent while retaining said frictional engagement of the container with said mandrel to immediately vaporize the foaming agent left on the portion of the outer surface to be foamed after said removal.

References Cited
UNITED STATES PATENTS

| | | | |
|---|---|---|---|
| 3,424,826 | 1/1969 | Aykanian et al. | 264—Dig. 82 |
| 3,534,130 | 10/1970 | Yamamoto | 264—54 |
| 3,531,554 | 9/1970 | Shelby | 264—327 X |
| 3,538,204 | 11/1970 | Grubb | 264—53 X |
| 3,262,625 | 7/1966 | Russell | 264—45 X |
| 3,389,199 | 6/1968 | Bushnell | 264—53 |
| 3,324,211 | 6/1967 | Maurer | 263—45 |

PHILIP E. ANDERSON, Primary Examiner

U.S. Cl. X.R.

161—116, 124, 160; 229—1.5 B; 264—28, 52, 53, 293, 327, 343, Dig. 5, Dig. 13; 425—4 R